Jan. 11, 1927.

C. E. F. AHLM

1,613,864

COMBINATION RAILROAD CAR AND POWER UNIT

Filed March 21, 1923    7 Sheets-Sheet 4

INVENTOR
Charles E. F. Ahlm,
BY Bates & Macklin,
ATTORNEYS

Jan. 11, 1927.

C. E. F. AHLM 1,613,864

COMBINATION RAILROAD CAR AND POWER UNIT

Filed March 21, 1923   7 Sheets-Sheet 6

INVENTOR
Charles E. F. Ahlm,
By Bates Macklin
ATTORNEYS

Jan. 11, 1927.

C. E. F. AHLM

1,613,864

COMBINATION RAILROAD CAR AND POWER UNIT

Filed March 21, 1923     7 Sheets-Sheet 7

Patented Jan. 11, 1927.

1,613,864

UNITED STATES PATENT OFFICE.

CHARLES E. F. AHLM, OF CLEVELAND HEIGHTS, OHIO.

COMBINATION RAILROAD CAR AND POWER UNIT.

Application filed March 21, 1923. Serial No. 626,546.

This invention relates to railway truck and coach construction, one of its objects being the provision of a combined power unit and railway car such as to permit an internal combustion engine, such as that of an automobile, being used effectively and efficiently with the present familiar coach and truck construction and whereby a simple driving mechanism may connect the motor with the axle of the coach or truck. Automobile constructions for power units for moving coaches and cars on railways have been in use, but for various reasons they are not satisfactory. Railway engineering requires that coach and car construction must not be materially altered. The truck construction in particular, will not permit of material changes.

In attempting to adapt an internal combustion automobile motor to such railway cars, the motors have usually been mounted upon the platform of the coach or car and connections have been attempted and in fact, more or less successfully accomplished, but with difficulty, where the driving means is extended through the pivotal connection between the car and truck, and then to one of the axles of the truck. Such a connection must necessarily allow universal movement at the joint between the car and truck and must also have universal movement to permit of the relative movement between the axles and the truck frame. It also necessitates turning several corners with the power driving connections, and it greatly interferes with the arrangement of suitable change speed gearing.

More specifically, therefore, the object of the present invention is to adapt an automobile motor and transmission mechanism to the truck, that is, the standard truck of a car or coach, without altering the standard and accepted railway construction of the truck and with the least amount of alteration of the car or coach body. In other words, I desire to combine the power unit of automobile practice, with the perfected engineering practice of railways, in a simple and effective manner. In this way, I obtain a better drive to the wheels, a simple rear axle driving connection between the driving means of the motor and the axle of the truck, more economical gear ratios and I improve, generally, the transmission system from the engine to the axle.

In carrying out my invention, I mount upon a standard railway truck, a suitable means for carrying a motor and transmission means and the connections between the motor and one of the axles of the truck, and at the same time make provision for relative movement of the axle and truck frame, and eliminate the usual trouble arising from the movement of the truck with relation to the car body.

Generally speaking, I may accomplish the above objects by either of two simple methods. One is to extend the carrying frame of the truck forwardly past the end of the usual car body and there mount a suitable cab or support for the driver, and bring the controls for the motor to the driver's position, and allow the support or cab, controls, etc., to be rigid with the truck frame while swinging with it independently of the car body. Another method is to cut through the floor of the car body and while still carrying all of the driving parts, the driver's support, control, etc., on the truck frame, and allow the driver's support to swing within the car body, wherefore the appearance of the present car body would be least interfered with.

Further objects in carrying out my invention are, to provide a power driving unit, including a truck, motor, control, cab, driver's cab, etc., connected to the car body only by the usual bolster pivot, whereby this unit may be removed from the car body with practically no difficulty, and then may be attached to other car bodies or be used for moving trailers and the like, when desired. My invention also permits the use of the standard brake, lighting and other equipment of the car.

In the particular embodiment shown in the drawings, I have included in the power mechanism and transmission means, an electric regenerative transmission device, such for example, as the type shown, described and claimed in my co-pending application No. 495,064, filed August 24, 1921, and this electrical transmission allows for the widest range of the changes in speed, as well as permits of regeneration for braking action, and furthermore, allows a generation of power for the car lighting battery, etc.

A practical, and at present, preferred form of my invention, is illustrated in the accompanying drawings, the following description relating to these drawings makes apparent the operation and construction thereof and brings out additional objects. The essential characteristics of my invention are summarized in the claims.

Figure 1:
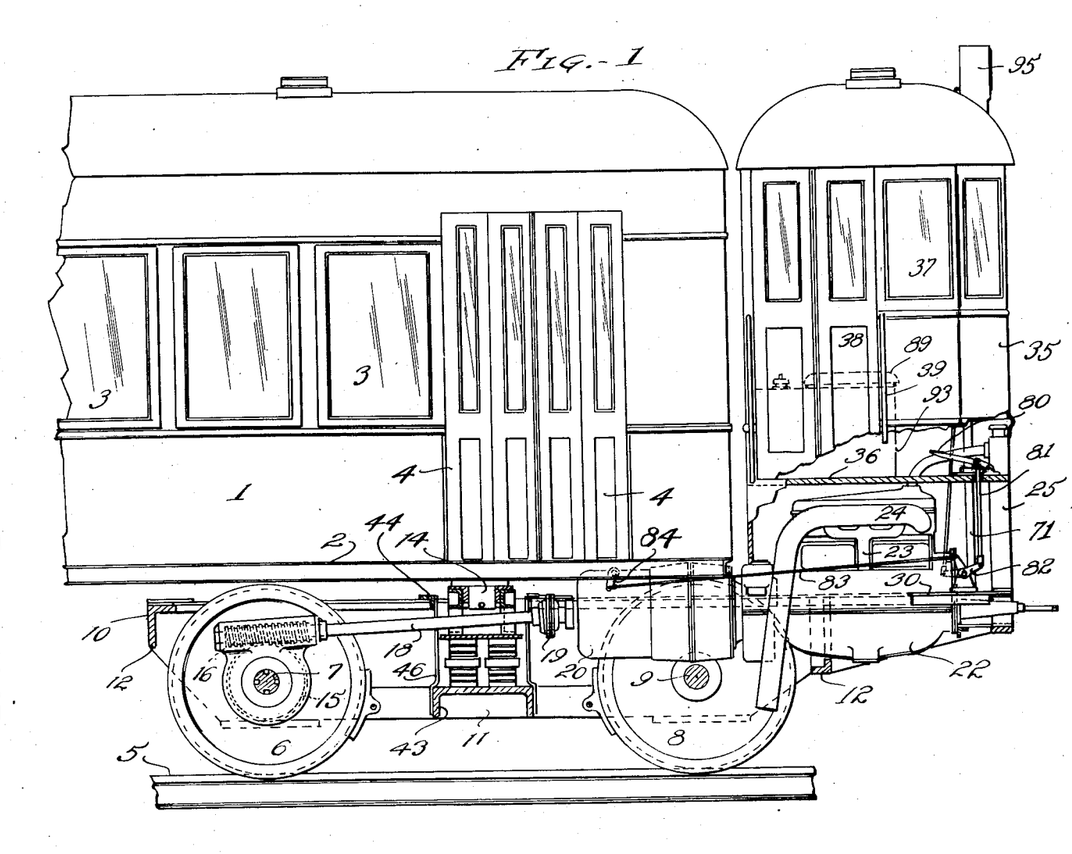
Fig. 1 is a side elevation of a portion of a passenger car and railway truck, the truck being partly broken away and shown somewhat diagrammatically and associated with a driver's cab and control at the forward end of the car; portions of the cab being broken away to illustrate the relative position of the motor therein.
Figure 2:
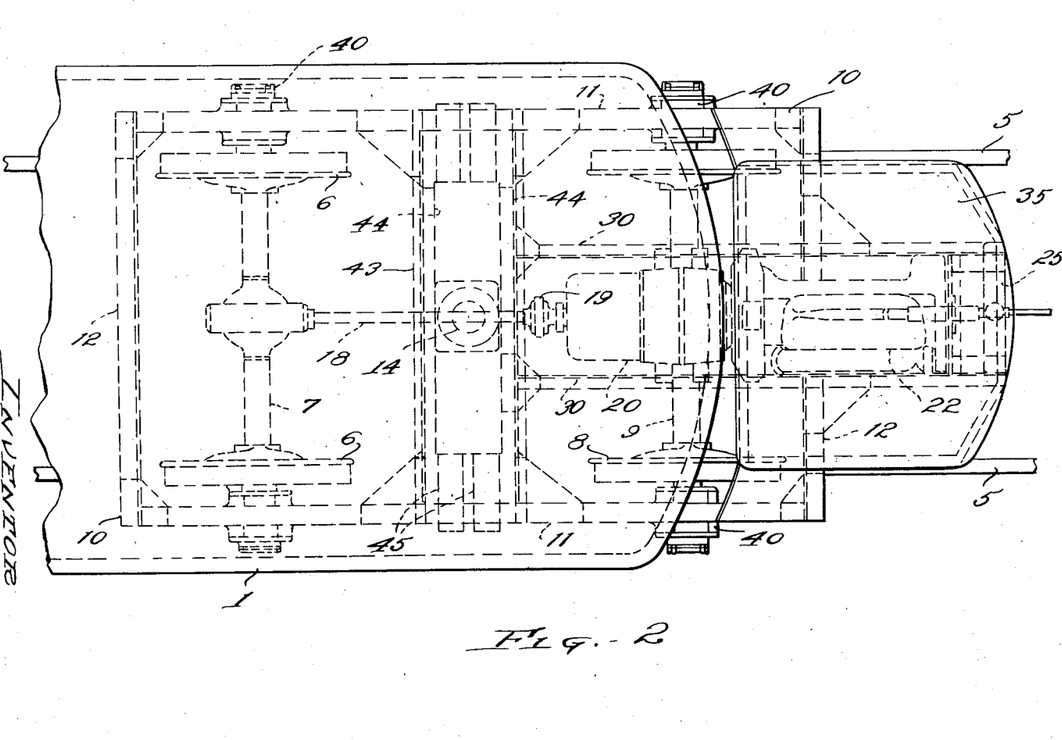
Fig. 2 is a plan view of these parts.
Figure 3:
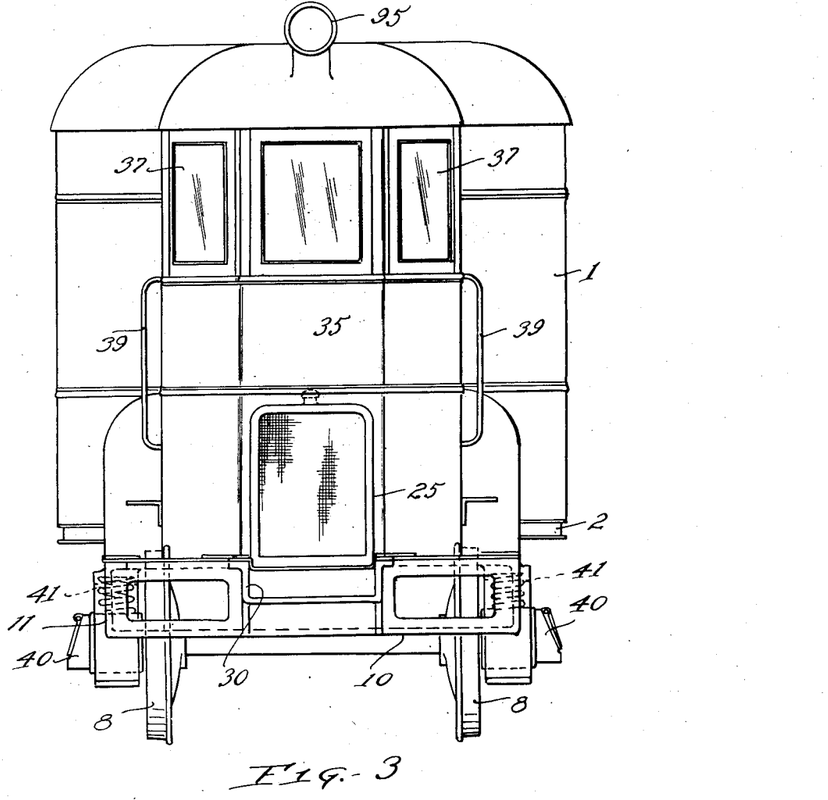
Fig. 3 is a front elevation of the cab and coach of this construction.

Referring to Figs. 1, 2 and 3, 1 designates the usual car body, having a base 2. The body may be supplied with the usual windows 3 and doors such as at 4. This body is, of course, supported in the usual manner by pivots upon two railway trucks, adapted to run on rails designated 5, and shown as having the usual wheels 6 on the axle 7, and wheels 8 on the axle 9, connected by a suitable frame 10, having side members 11, and cross members 12, the central cross member being reinforced as is usual to support the usual pivot 14. The rear axle of this truck is shown as provided with a worm gear 15, with which meshes a worm 16, mounted on a floating or universal shaft 18, connected through a universal joint 19, with a suitable transmission mechanism within a housing designated 20. The worm and worm gear are preferably mounted in suitable housings, rotatably embracing the axle 7, whereby when the rear axle moves upwardly and downwardly with relation to the truck frame, and therefore, with relation to the transmission mechanism, it may relatively shift about this axle as the angle of the driving shaft is thereby changed. The driving shaft 18, may of course, be telescoping or sufficient movement may be allowed at either end thereof, by flange connections as desired. The transmission mechanism is of the generative electric type which may be used to change the relative speed of the motor and driving shaft 18, through varying degrees by magnetic reaction and up to points of overspeed with relation to the motor by generative effect and used for braking action by causing regeneration, due to the relative movement of the driving and driven shaft, that is, of the axle and motor on down grade or when coming to a stop. The transmission mechanism of course, may be of any suitable type, either mechanical or electrical but as stated, I prefer to use some such mechanism as that shown, described and claimed in my application above referred to.

The motor is of any usual type used in automobiles or motor trucks and is shown only as illustrative of such a motor. As shown, 22 designates the frame, including the housing and 23 and 24 the intake and exhaust manifold, while 25 designates the usual radiator connected with the water jacket of the motor. These parts are shown and referred to only to illustrate the relative position of the motor and truck frame. I will now describe the method of mounting the motor and transmission means of the truck frame 10.

It will be noted particularly in Fig. 2, that rigid with the truck frame are two separated forwardly extending beam members 30. These members extend to each side of the transmission means and motor frame and forwardly of the truck frame for a considerable distance, thus permitting the mounting of the motor considerably forwardly of the forward axle, the motor being secured to the members 30, which are in turn suitably secured to the cross members of the frame of the truck in about the same manner as motors are usually mounted in the frames of automobiles and trucks, that is, the laterally projecting brackets or lugs of the motor frame rest upon the parallel beams or frame members 30, which in turn are spaced at their forward ends and arranged to support the usual radiator 25.

One of the great advantages accomplished by the arrangement of a mounting, such as illustrated, is that I am enabled without difficulty to resiliently mount the motor and transmission means with springs under the engine supports as is frequently done in road trucks, for example. Such relative movement of the motor and truck frame will allow the absorbing of the truck vibration and avoid damage and wear to the motor and transmission parts. With the universal drive shaft, such movement is possible.

and affords no objectionable features and needs no change in the construction.

Figure 8:
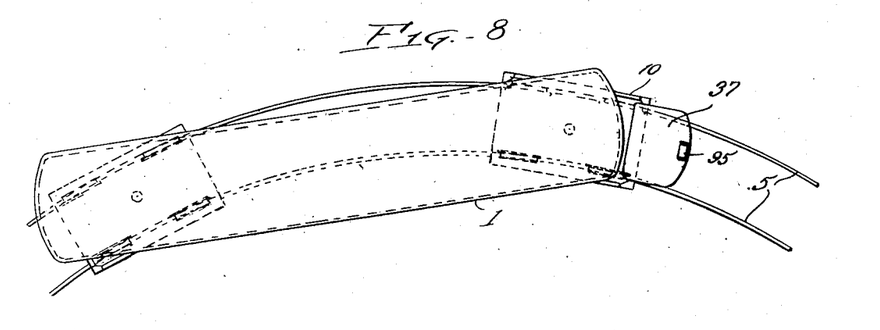
Fig. 8, is a plan view of a car, trackway and truck, showing the relative movement of the same, where the construction is that of Figs. 1, 2 and 3.

A cab surrounding the motor and rising therefrom, may be mounted upon a frame structure consisting of a substantially rectangular frame 35, secured to the truck frame and to the members 30 rigid with the frame, and above the motor in this cab which is designated as a whole 35, may be a floor 36 which may form the operator's support. By arranging this cab so that it is entirely mounted upon the frame of the truck, it will be seen that it will swing with the truck, that is, it will continually follow the trackway, as does the flange steered truck, while the projecting portion of the car forwardly of its pivot 14, may swing sideways of the trackway, and therefore, of the truck, as indicated in Fig. 8. The cab may be of any suitable construction but for convenience, I have illustrated it as provided with front and side windows 37, while at 38 a suitable doorway may be arranged, at either side of which are handles 39 to facilitate the driver's entrance and exit from the cab.

Figure 7:
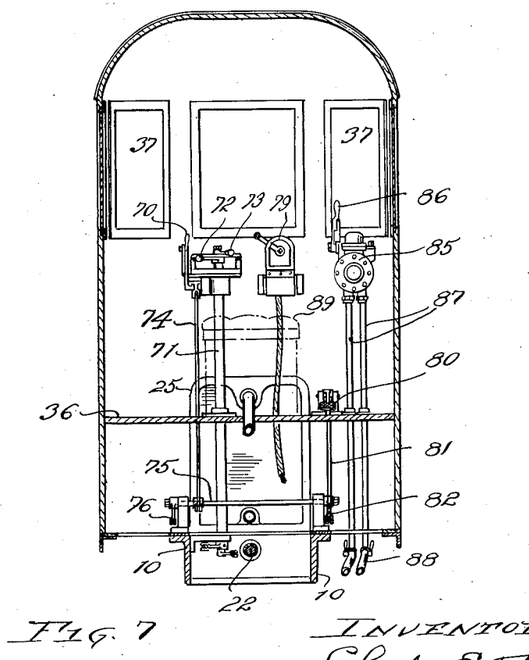
Fig. 7 is a vertical sectional detail of the driver's cab of Figs. 1, 2 and 3, showing the relative arrangement of the driver's support and a suitable arrangement of controls for the motor, brakes, etc.

Within the cab as illustrated in Fig. 7, I have provided a convenient arrangement of the control mechanism which will now be described. Connected with the regenerative unit by suitable linkage is a lever 70 for shifting a series of brushes about their commutator on the primary armature. The lever 70 is shown as mounted on a bracket near the top of a hollow post 71, extending through the floor and held rigid by the floor and a bracket on the truck frame 10. This post corresponds to the steering column in an automobile and contains shafts for controlling the spark and gasoline feed, which have at their upper extremity control levers 72 and 73 operating on a quadrant in the usual manner.

The control lever 70 is a bell crank, an arm of which carries a link 74 operating on a rock shaft 75 supported by the truck frame. At the left of the rock shaft is a lever arm which carries a link member 76 shown in Fig. 5 connected with a bell crank 77, an arm of which rocks the brushes in the regenerative unit through a rod 78.

The controller unit 79 for the regenerative system may be mounted on the forward wall of the cab. 80 indicates a foot pedal for operating the mechanism referred to in my co-pending application as the "reversing drum" and is connected by means of a link 81, a bell crank 82 and a rod 83 to the brake arm 84, best shown in Fig. 1.

The usual valve arrangement for controlling the air braking system is provided at 85 having a control lever 86 and conducting pipes 87 extending through the floor and connected with the car by the usual flexible hose coupling 88.

A driver's seat may be provided within easy reach of all these control members such as indicated in broken lines at 89 in Fig. 7.

Figure 4:
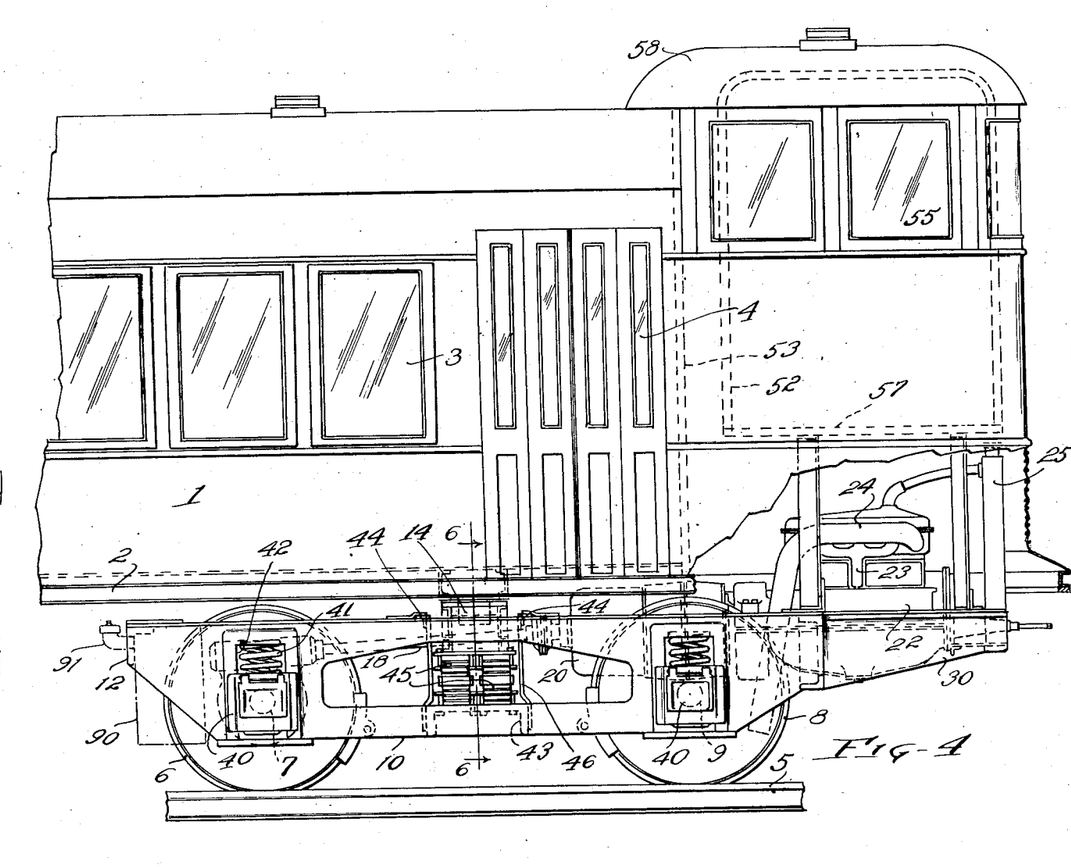
Fig. 4, is a side elevation showing the arrangement of the driver's cab or support with the control inside of the coach, and carried by the truck.
Figure 5:
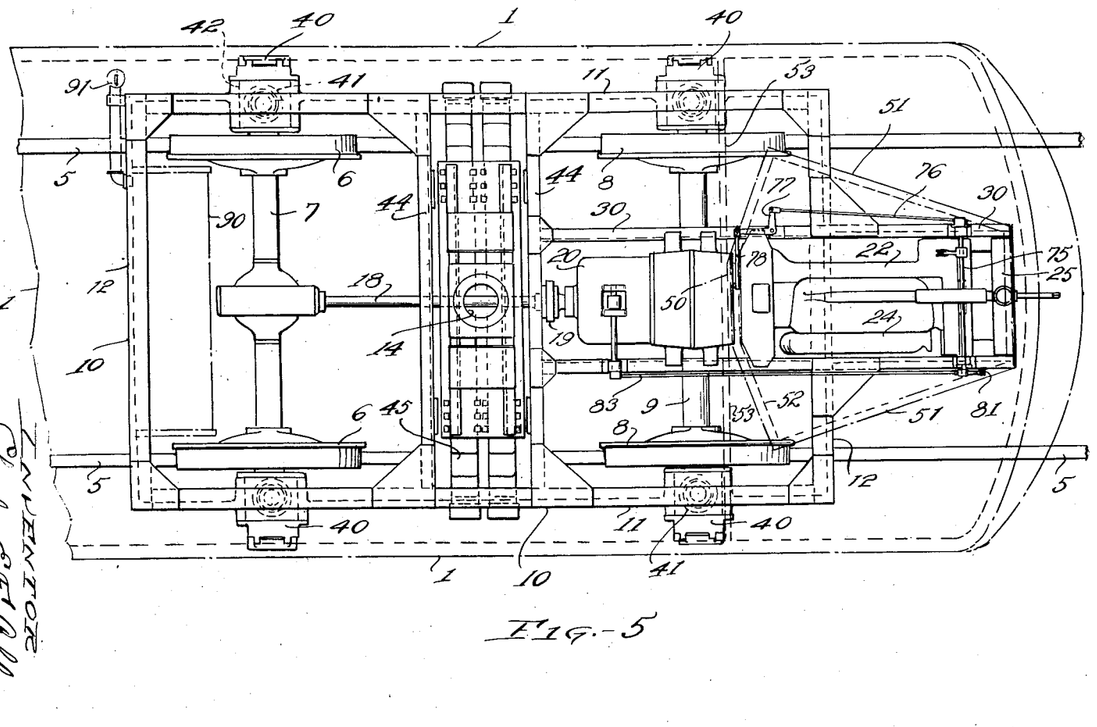
Fig. 5 is a sectional plan of the power unit mounted on the truck, showing the relative position of the car body and driver's support or cab, in broken lines.
Figure 6:
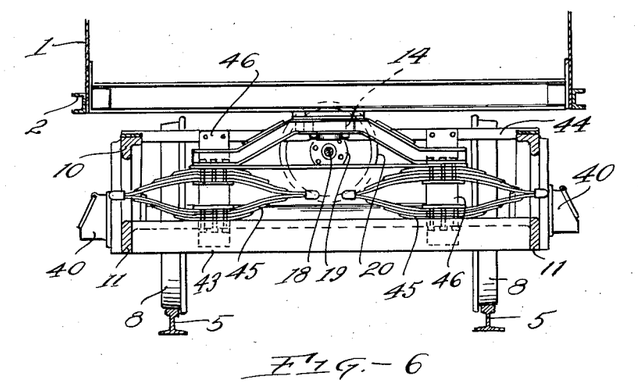
Fig. 6 is a transverse vertical section through the truck, at the pivot thereof, showing the relative position of the motor and car body, the plane of the section being taken substantially on the line 6—6 of Fig. 4.

Suitable fuel storage receptacles may be provided on the truck in proximity to the driven axle as shown in broken lines at 90 in Figs. 4 and 5, where it may be supported by the end or side frame members. A filling tube 91 is shown as leading rearwardly and to the side of the car in an easily accessible position. Another convenient location is illustrated in Fig. 1 wherein the fuel supply tank 93 might serve as a support for the driver's seat. It has been found convenient to mount electrical storage units beneath the coach body where they may be easily accessible and at the same time be out of the way of moving parts. No specific manner of so mounting the unit is illustrated. Such a storage unit could be very simply connected with the regenerative system and the necessary control switches in the driver's cab.

From the description preceding, it will be seen that I have provided the composite unit, consisting of the flange wheels and axles and truck frame of usual standard construction, such as reflects railroad practice to the extent of practically requiring no alteration of this truck, and with this have combined the driving mechanism carried thereby, in such a fashion as to afford no mechanical or engineering difficulties. That is, the motor is rigid with the truck, the transmission mechanism is connected with the motor in the usual fashion, and extending from the transmission mechanism is a worm and worm gear driving means, connected with the rear axle of the truck. This is a construction with which no difficulty need be encountered, and which for the mechanical purposes thus accomplished, is remarkably effective. It will be further noted that in the cab, the control is within easy reach of the driver, both for the motor and the transmission which may be connected without the necessity of flexible or extensible parts with the parts to be governed and controlled. The same is true of the braking mechanism. The brakes are to be applied to the wheels and may be the usual brakes applied by air cylinders such as are most commonly used in railroad practice and this requires only the usual air line connection, with the valves such as previously described, mounted near the driver's position and all movable with the truck frame. It will also be seen that the only connection between the driving unit, consisting of the motor, transmission, truck and cab, and the car body, is the usual bolster pin or pivot and that by lifting the car body, this power unit may be driven from the car body and attached to another, or may be used independently of cars and to draw or push them for switching purposes or in an emergency.

It will further be noted that the arrangement heretofore described consists of a car body supported at one end on a standard truck and on the other end on a standard truck, altered only sufficiently to carry the motor, transmission mechanism and driver's cab, and that both of these trucks are connected to the car body in the usual manner and without any alterations of this vital portion of railway car construction.

I will now describe a modified form of this arrangement which consists essentially of the same mechanical combination but which avoids the shortening of the car body to provide for bringing the motor closer to the truck, than would be practical in case the usual overhang of the car body beyond the truck should be permitted.

Referring now to Figs. 4, 5, 6 and 9, it will first be noted that I have shown somewhat more of the truck construction and motor mounting, which will make clear the description in this connection relating to the construction above described. Here the side frame members of the truck are shown as extending downwardly and receiving the usual axle bearing boxes indicated at 40, while the springs 41 over these axle boxes are carried above the boxes and within the guide recess above as indicated at 42. The central portion of the truck is shown as having cross members 43, 44, between which are the springs carrying the pivot bolster, in turn carrying the pivot receiving bracket for the pivot 14; these springs are designated 45. Vertical plate members 46, carried by the cross members serve to check any bending or twisting of the spring due to a pitching movement of the car. With this sort of side frame construction, a suitable forward extension may be provided, where instead of bars 30 alone, I have suitable brackets extending downwardly for a deeper vertical height as shown at the forward end of the truck in Fig. 4.

The principal difference in the construction shown in this modified form, is that above the motor and carried on a suitable frame, having parts which may be illustrated by broken lines at 50, 51 and 52, Fig. 5, I have a much narrower cab within the usual overhang or front portion of the car body. This cab may be a mere frame work, while the driver looks out through windows such as 55 in the forward end of the car body, and to allow sufficient height for the driver to stand on a platform such as indicated in broken lines in Fig. 4 above the motor, and designated 57, the forward portion of the car body 1, may be raised as indicated at 58 in the upper portion of this figure.

Figure 9:
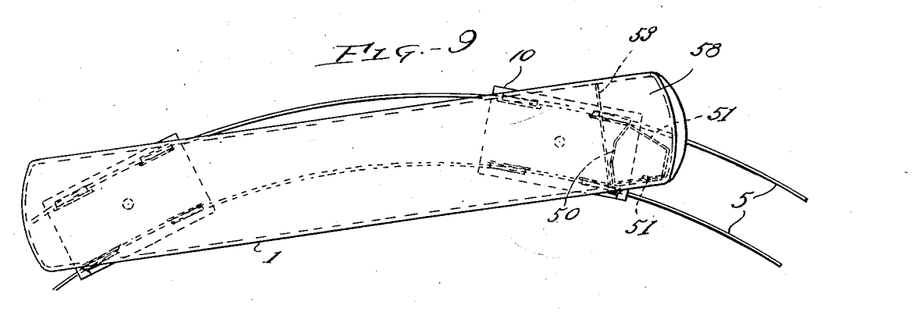
Fig. 9 is a similar view, showing the manner of relative movement between the driving truck and platform, where the driver's support and cab are within the car body.

The frame work of the cab is narrower at the front than at the rear, and the rear walls are formed on slight angle with relation to the normal transverse direction of the car, so that when the truck and car body change their relative angle, as illustrated for example in Fig. 9, the side wall or frame members 51 of the cab may lie approximately parallel to the side wall of the car body. while the rear wall 52 may lie approximately parallel and adjacent a transverse wall 53, setting off the cab space from the remainder of the interior of the car. A suitable opening for the driver to pass through may be formed in wall 53 and in the rear wall of the cab, so that he may have entrance therefrom, to the main body of the car.

Figure 10:
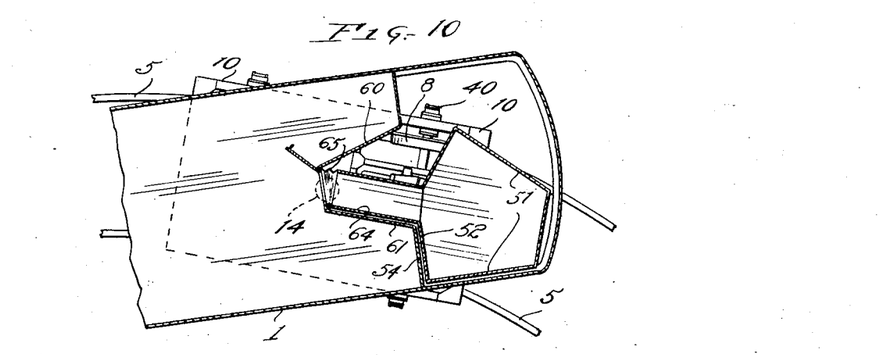
Fig. 10 is a slightly enlarged sectional plan of a modified arrangement showing the cab with a passageway.

In case it is desirable to avoid the danger of the relative shifting of the walls 52 and 53, while the truck and car body swing as they do passing around curves, switches and under like conditions, a rearward extension may be made of the cab, such as illustrated in Fig. 10, which forms a narrow passageway only sufficient for the driver or motorman to pass and extends substantially to the position of the pivot 14. In this case, guard walls 60 and 61 would be formed at either side of this passage, corresponding to the angle which the wall 64 forming the passage may make, and it will be noted that the walls 54 and 61 will allow the extension of the seating capacity substantially to the position where the wall 53 would come, in the form of car shown in Fig. 5. In this case, I would need only a very slight sliding connection between the frame or passage wall 64 with those of the walls 60 and 61, and such sliding connection would be equally disposed about the line or vertical axis of the pivot, whereby the connection between the movable walls leading to the driver's cab or support, and the relatively stationary wall of the car body, would require but the slightest movement, and correspondingly could be made to eliminate any danger resulting from this relative movement.

If necessary, a movable wall of bellows construction such as indicated at 65, Fig. 10 might be used between the ends of the members 64 and the doorway or opening, or the construction might be such that the wall members 64 would extend a short distance through the opening leading into the coach.

Thus it will be seen that I have provided a power driven unit adaptable to the usually accepted form of railway coach which may preserve the integral appearance of the structure and at the same time embody all the essential advantages earlier set forth.

My invention, not only permits of embodiment in an automotive railway car combination with simplicity, but has many additional advantages. For example, with either construction described, the operator is always facing directly along the trackway even though the end of the car body may be pointing away from the trackway at a sharp angle as is always the case on a sharp curve. Another advantage is, that the head lamp mounted as indicated at 95 on the cab 35 would be pointing along the trackway at all times instead of first to one side and then the other as is now the case with the usual electric car or locomotive arrangements.

The construction illustrated may, of course, be applied to both ends of the car, whereby I am enabled to meet one of the frequent demands of railway engineers for double end drive of such cars. These may drive at the same time, although normally would be simply used singly; one at one end for running the car in that direction, and the other at the other end similarly arranged, so that the car might be operated equally well in both directions.

By the use of the mounting and arrangement described with the electrical transmission, the objection to mechanical gear shift is as stated entirely eliminated, and the very necessary gradual speed changes without loss of power, allows very great flexibility of control while providing economy and efficiency of operation.

Having thus described my invention, I claim:—

1. In combination with a railway car having the usual flanged wheel trucks pivoted thereto and supporting the body thereof, of an internal combustion motor mounted on one of the trucks rigid with the frame thereof, transmission gearing connecting the motor with one of the axles of said latter truck, an operator's cab mounted on the truck and extending upwardly and having its floor above the floor level of the car and having controls within the cab.

2. In combination, a flange steered truck, a car body pivoted at one end to the truck and projecting forwardly of the truck, partition members within the car body forward of the pivot point whereby the seating capacity of the car may be increased and partition members extending rearwardly therefrom centrally of the car body and substantially to the pivot point.

3. In combination a flanged steered truck, a car body pivoted at one end to the truck and projecting forwardly of the truck, partition members within the car body forward of the pivot point whereby the seating capacity of the car may be increased, partition members extending rearwardly therefrom centrally of the car body and substantially to the pivot point, a door bridging the last named partition members, and an operator's support mounted on the truck and swingable therewith and extending rearwardly to the door.

4. In combination a flange steered truck, a car body pivoted at one end to the truck and projecting forwardly of the truck, partition members within the car body forwardly of the pivot point whereby the seating capacity of the car may be increased and partition members extending rearwardly therefrom centrally of the car body and substantially to the pivot point, an operator's platform mounted on the truck and movable within the car body and a passage whereby the operator may have safe access to the main compartment of the car.

5. The combination of a car body having side, front and rear walls, partition members extending inwardly from the side walls and rearward continuations of said partition members, a flange guided truck, a frame therefor, a pivotal connection between the truck and the car body substantially in line with the ends of the last named partition members, a power unit mounted on the truck frame, an operator's platform carried by the frame forwardly of the pivot and extending within the car body, control levers located on the platform and sidewalls contiguous with the platform and defining a runway movable within the rearwardly extending partition members.

6. In combination a trackway, a truck guided thereby, a car body pivoted to the truck and superposed at one end on the truck, a transverse partition within the car body forwardly of the pivot point, an operator's support mounted on the truck and rearwardly extending walls defining a telescoping passage extending rearwardly from the support and beyond the partition.

7. In a flange steered truck, a frame, a pair of axles, wheels supporting the axles, a resilient mounting for the axles on the frame, power means carried on the frame and a propeller shaft and universal joint connecting said means to one of the axles, a cross frame member and springs carried thereby, an arched member bridging the propeller shaft and resting on said springs and a pivot rest for one end of a car supported by the crown of the arch.

8. A trackway, a pair of flange steered trucks, a car body superposed on the trucks, power means mounted on one of the trucks independent of the car body comprising an internal combustion motor, an electric regenerative transmission system, a universal joint, a propeller shaft, reduction gearing associated therewith, an air brake mounted on the truck, an operator's cab mounted on said truck and substantially rigid therewith and adapted to swing independently of the body and within the same, and control levers and fuel storing means within the cab.

9. In an automotive railway car, a four wheeled truck, a frame therefor, a pivot plate carried by the frame, a car body supported at one end by the pivot plate, power means mounted on the frame, a power control system and an operators support mounted on the truck frame and the support positioned within the car body and laterally movable relative thereto.

10. In an automotive railway car, flanged wheels, axles, a truck frame therefor, power means mounted on the frame and drivingly connected with one of the axles, a pivot plate carried by the frame intermediate the axles, a car body having a pivot bolster associated with the said pivot plate, a cab rigidly mounted on the said frame and positioned within the car body, and relatively movable thereto.

In testimony whereof, I hereunto affix my signature.

CHARLES E. F. AHLM.